July 7, 1964  M. W. PINCKNEY  3,140,185
METHOD AND APPARATUS FOR MAKING CHEESE
Filed Feb. 18, 1963  4 Sheets-Sheet 2
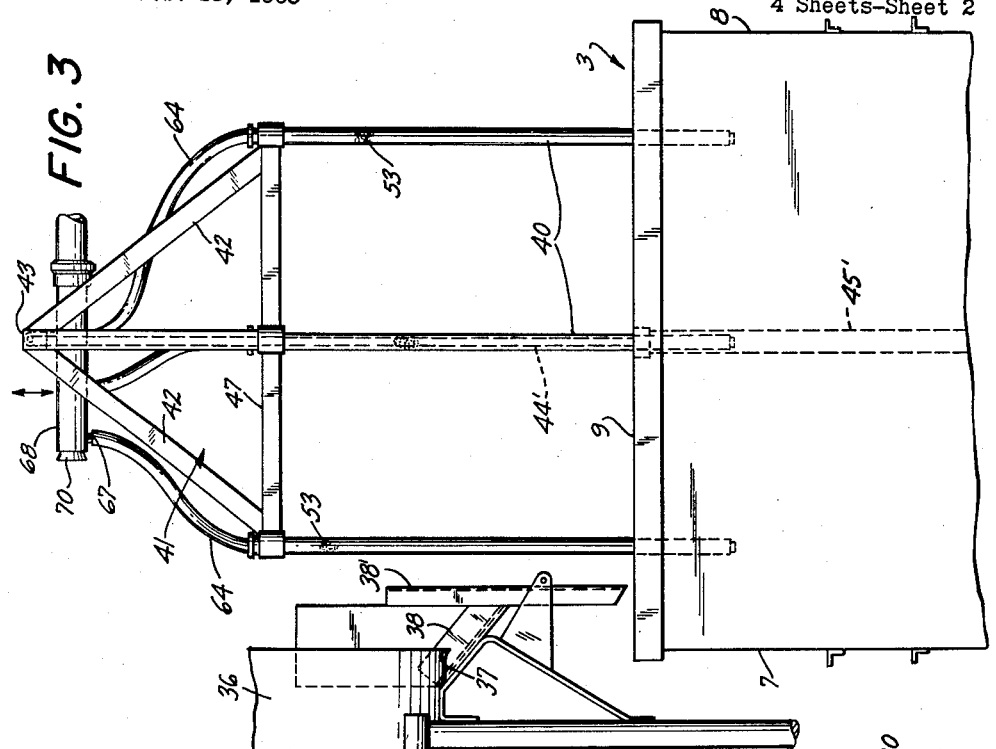
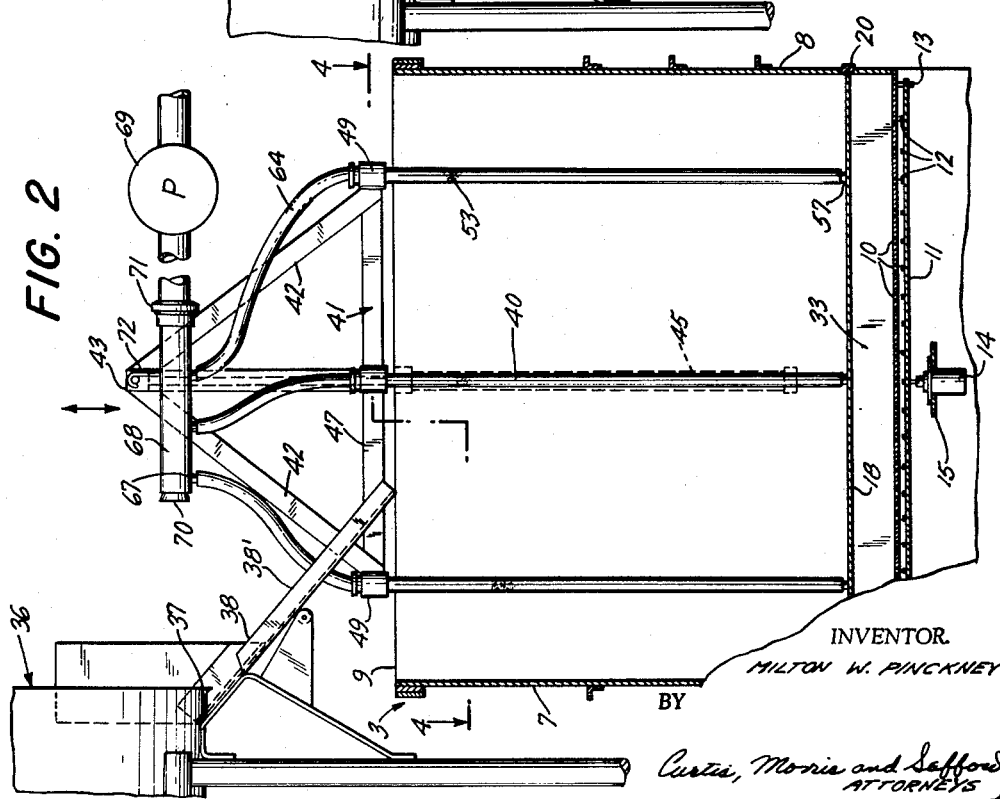
INVENTOR.
MILTON W. PINCKNEY
BY
Curtis, Morris and Safford
ATTORNEYS

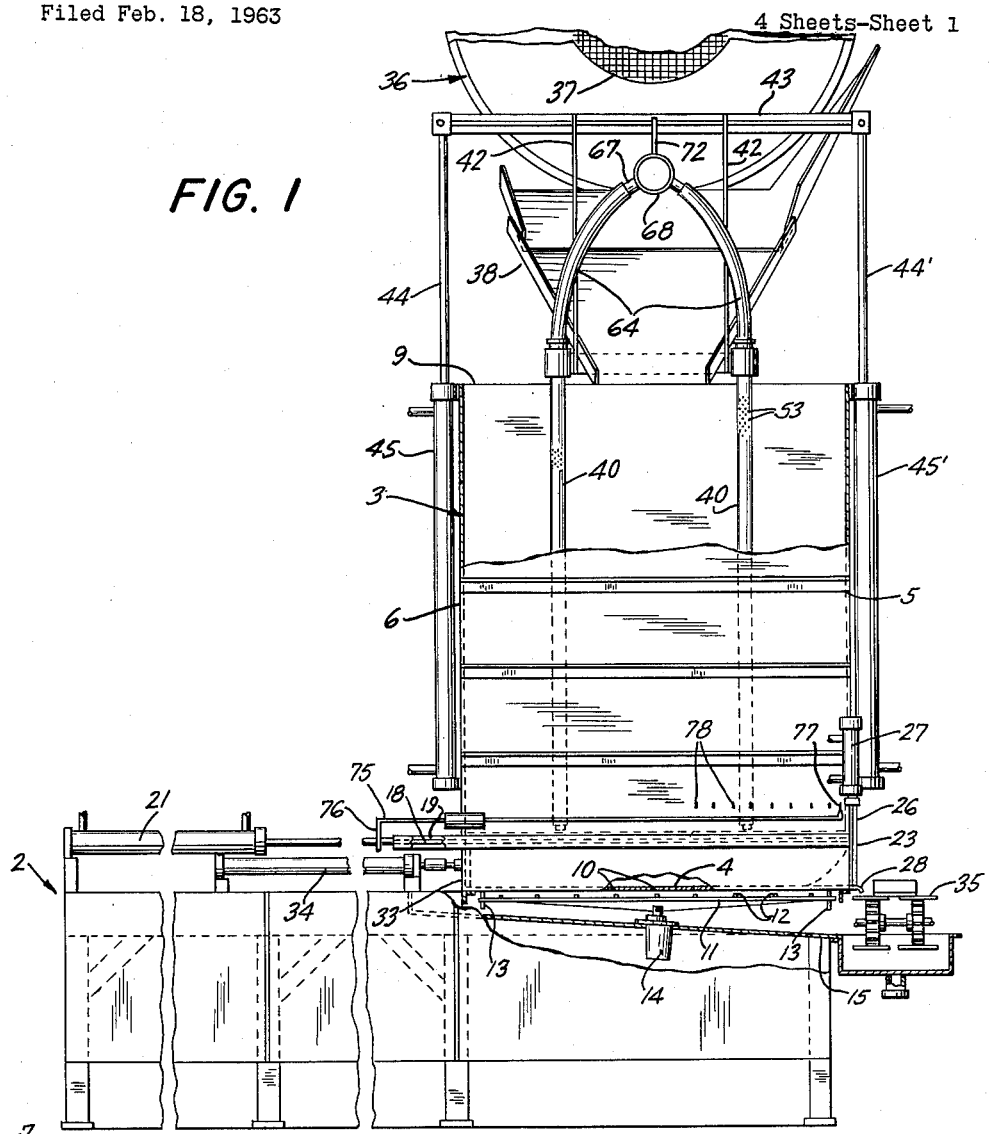

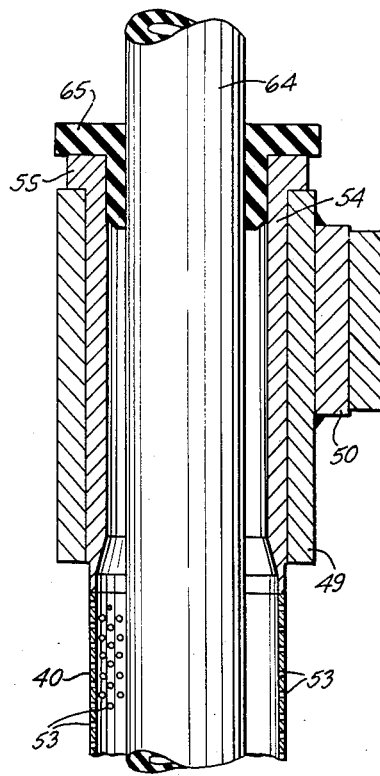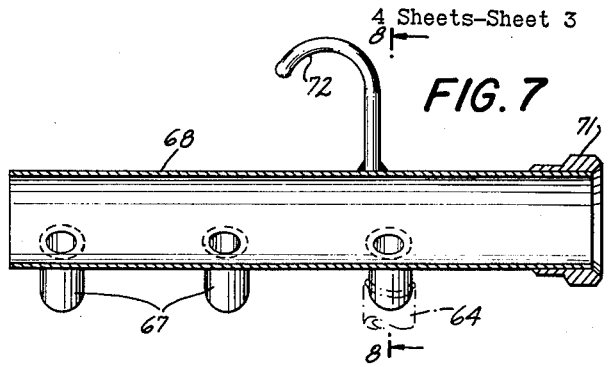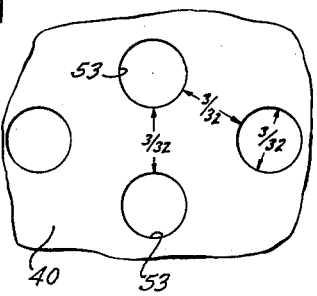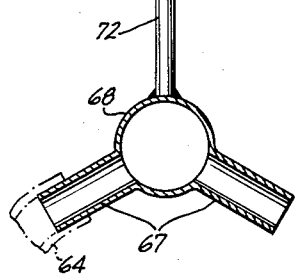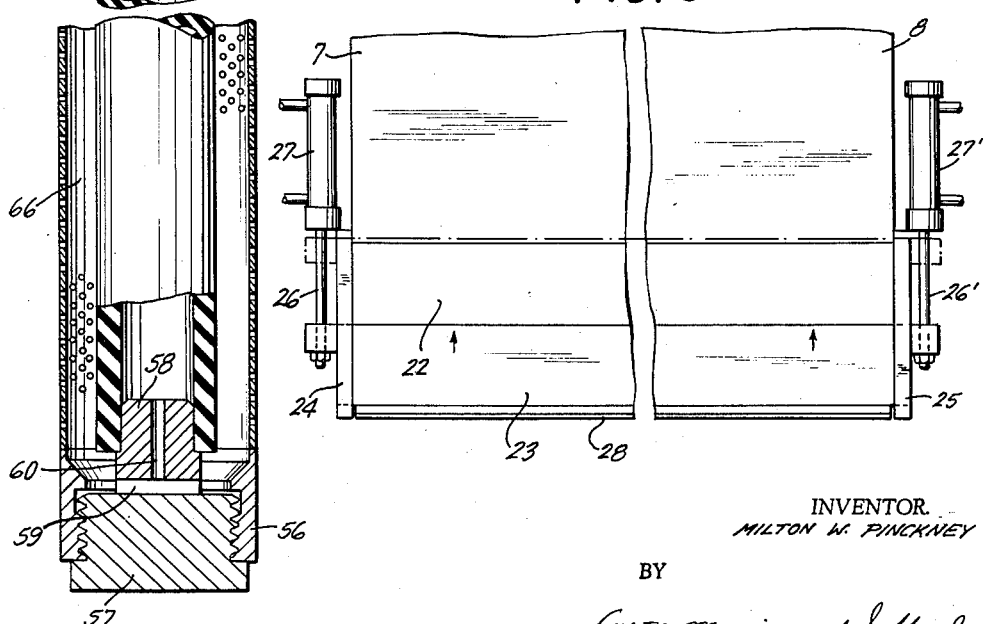

July 7, 1964  M. W. PINCKNEY  3,140,185
METHOD AND APPARATUS FOR MAKING CHEESE
Filed Feb. 18, 1963  4 Sheets-Sheet 4
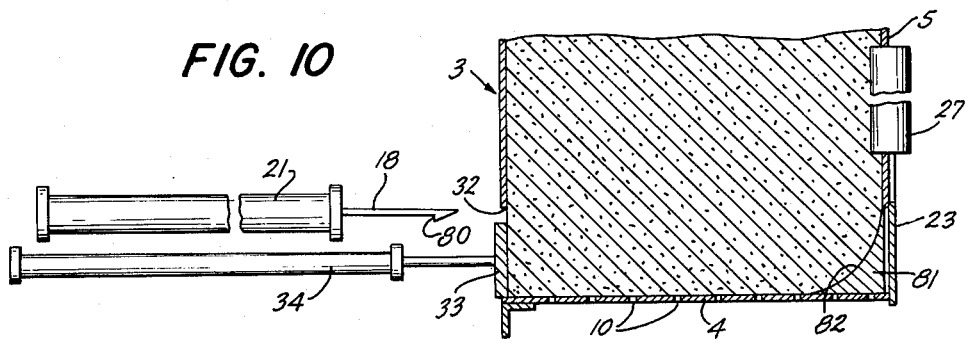
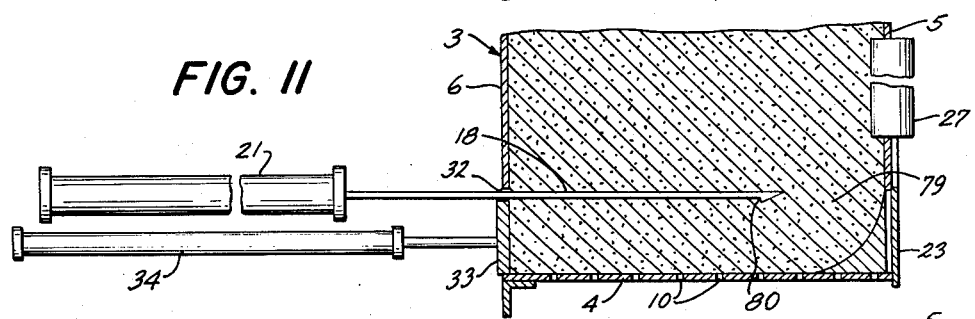
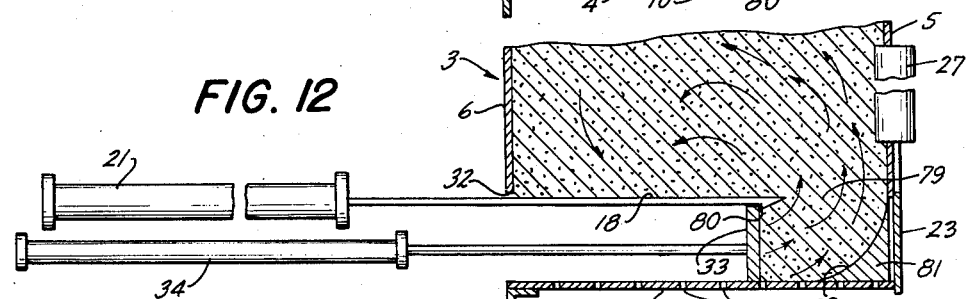
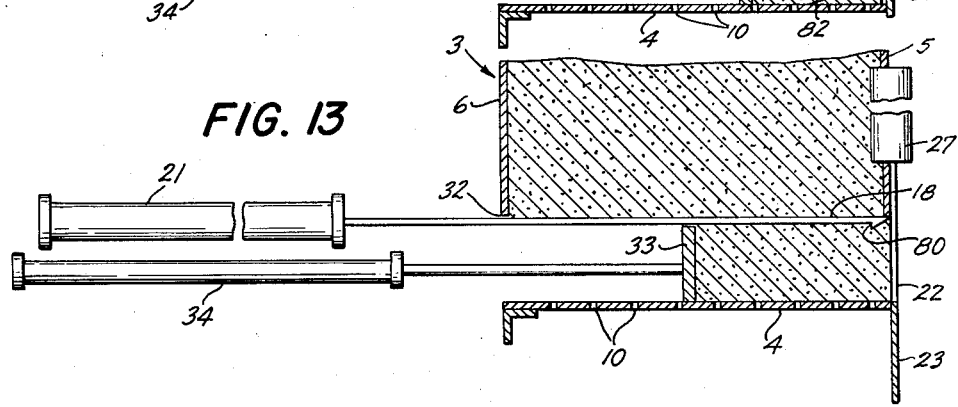
INVENTOR.
MILTON W. PINCKNEY
BY
Curtis, Morris and Safford
ATTORNEYS

United States Patent Office 3,140,185
Patented July 7, 1964

3,140,185
METHOD AND APPARATUS FOR
MAKING CHEESE
Milton W. Pinckney, Wappingers Falls, N.Y., assignor, by mesne assignments, to The De Laval Separator Company, Poughkeepsie, N.Y., a corporation of New Jersey
Filed Feb. 18, 1963, Ser. No. 259,339
18 Claims. (Cl. 99—116)

The present invention relates to the manufacture of cheese and more particularly to improvements in the method and apparatus described and claimed in the prior applications of William W. McCadam, Serial No. 642,783, filed February 27, 1957, entitled Method and Apparatus for Making Cheese, now Patent 3,078,169, issued February 19, 1963, and Henry Leber, Serial No. 771,699, filed October 23, 1958, entitled Method of Making Cheese, now Patent 3,078,170, issued February 19, 1963.

The method of and apparatus for making Cheddar type cheese as described and claimed in both of said applications eliminates the manual cheddaring step of conventional cheese making methods, eliminates any bodily contact with the product to improve the sanitation of the cheese making process and reduces the time and labor required to make a batch of cheese. The milk is processed in a conventional manner by mechanical equipment to the point of producing blocks of curd for manual cheddaring. These conventional steps comprise delivering milk through sterile pipes into a sterile cheese making vat where it is inoculated with a lactic acid-producing starter; allowed to ripen; treated with rennet to coagulate the milk; cut to form curds, and; cooked to further separate the whey from the curds. In accordance with the method and apparatus described in said applications the curd separated from free whey is delivered to a vessel and subjected to pressure at a temperature favorable to acid development for a period of time required to produce the desired flavor and texture. The pressure treatment of curd replaces the manual cheddaring previously required and acts to squeeze the curd mass to remove whey therefrom and mat the curds into a fused mass of a tenuous texture. Thus, the pressure step produces a dry curd mass in which acid develops to produce a Cheddar type cheese in a reduced period of time from that required for manual cheddaring.

One of the objects of the present invention is to provide an improved method of and apparatus for producing a Cheddar type cheese which even further reduces the free whey and moisture content of the curd mass for dry acid development therein.

Another object is to provide a new method of and apparatus for mechanically cheddaring the curd mass to reduce the time required and improve the product.

Still another object is to provide an improved apparatus for removing free whey and mechanically cheddaring the curd mass which is of relatively simple and compact construction, economical to manufacture, easily disassembled for cleaning and sterilizing and reliable in operation to produce a good to excellent cheese in flavor and taste.

These and other objects will become more apparent from the following description and drawings in which like characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a side elevational view of an apparatus for practicing the method of the present invention and showing the vessel into which the curd mass is delivered and the perforated drain tubes at spaced locations in the curd mass.

FIGURE 2 is a side elevational view of the vessel in section to show the frame for mounting the perforated tubes in spaced relation, the header connected to the perforated tubes and the vacuum pump connected to the header for withdrawing whey;

FIGURE 3 is a view similar to FIGURE 2 showing the frame being lifted to withdraw the perforated drain tubes from the vessel and the pivoted chute folded to an inoperative position to provide clearance of the movable frame;

FIGURE 4 is a plan view partly in section taken on line 4—4 of FIGURE 2 to show the open frame for detachably mounting the perforated drain tubes for movement into and out of the vessel and further showing pockets of free whey in the curd mass which are drained by the drain tubes;

FIGURE 5 is an enlarged part sectional view of one of the perforated drain tubes in side elevation to show the manner of detachably mounting it on the frame and the rubber hose at the interior of each tube for withdrawing whey;

FIGURE 6 is a further enlarged view of a portion of the perforated tube to show the relative size of the perforations and their spacing from each other;

FIGURE 7 is an enlarged sectional view of the header showing the nipples to which the rubber hoses are detachably connected and the hook for detachably mounting the header on the frame;

FIGURE 8 is a transverse sectional view taken on line 8—8 of FIGURE 7 to show one pair of nipples projecting from the header;

FIGURE 9 is a front elevational view of the lower portion of the vessel to show the outlet opening therein and vertically operable blade for closing the opening and cutting slabs of cheese extruded therefrom;

FIGURE 10 is a transverse sectional view of the lower portion of the vessel to show the perforated bottom wall and curved guide for directing curd upwardly when cheddaring;

FIGURE 11 is a view similar to FIGURE 10 showing the horizontal blade actuated to a power cheddaring position to segregate a layer of curd from the remaining mass and provide an opening between the end of the blade and the front wall of the vessel;

FIGURE 12 is a view similar to FIGURES 10 and 11 showing the plunger actuated to force the segregated layer of curd through the restricted opening into the remainder of the curd mass to mechanically cheddar the curd mass, and;

FIGURE 13 is a view similar to FIGURES 10 to 12 showing the horizontal blade moved entirely across the vessel, the vertical blade lowered to open the front of the vessel and the plunger being actuated to extrude a slab of cheese from the vessel.

The conventional steps of initially treating milk to form a curd mass are performed in the usual way in the method of the present invention. These steps include delivering milk through sterile pipes into a sterile cheese vat, adding a conventional bacterial lactic acid-producing starter and rennet to the milk, maintaining the milk at a temperature of about 85° F. for a period of about one half hour during which time the milk coagulates or sets to form a jelly-like mass, cutting this coagulated mass into cubes, referred to and commonly known as "curds," heating the curd to a temperature of approximately 100° F. or slightly higher while agitating the mass to exude whey from the curd kernels and draining the free whey from the curd mass.

In accordance with the method of the present invention the separated curd is delivered to a confined space where additional whey then is withdrawn from the curd mass at a plurality of spaced locations throughout the area of the confined space to form a block of dry curd.

After the curd mass has been drained for a sufficient period of time to indicate that further whey removal cannot be obtained, the curd mass is mechanically cheddarded.

The curd mass is mechanically or power cheddarded by segregating a portion of the curd mass from the remainder of the mass and applying an internal force on the segregated portion to cause it to flow through a restricted path into the remainder of the mass. This operation is repeated until the entire mass of curd has been cheddarded at least once and until the curd has matted ino a block and has a "chicken breasted texture" which permits continuous strings to be pulled from the remainder. This mechanical cheddaring performs the function of pressing the curd to squeeze out free whey and to physically displace all portions of the curd mass so that any pockets of whey will be moved into engagement with a side of the confined space where the whey may be drained.

After the mechanical cheddaring of the curd mass has been completed, it is left in a quiescent state at a temperature suitable for acid development for a period of time required to produce the desired acid content. The mechanical cheddaring provides for "dry acid development" in the curd mass as distinguished from wet acid development where free whey is present. This reduction in moisture and the elimination of pockets of whey produces a superior cheese product both in texture and flavor. After the acid development in the cheese has been completed, it is removed from the confined space and salted. Preferably, salting is performed after the cheese mass has been shredded by either subjecting it to dry salt or warm salt brine as in the McCadam and Leber applications, referred to above.

The draining of the curd mass at spaced locations in the confined space may be performed in any suitable way, but in the illustrated embodiment the draining is performed by perforated drain tubes located at spaced points and extending throughout the height of the curd mass. The drain tubes act as sieves or strainers to permit the flow of whey but prevent the flow of curd into the tubes. Whey separated from the curd then flows through the perforations into the tubes which, in turn, are connected to a vacuum source to withdraw the whey therefrom. The curd mass is in a rather fluid state and is adapted to flow from one location to another in the confined space and, due to the low pressure, causes free whey to flow toward the vacuum source. It has been found that any pockets of free whey in the curd mass located within six inches of the periphery of a perforated drain tube will migrate to and flow into the drain tube. It is therefore desirable to locate the drain tubes at a distance no greater than twelve inches from periphery to periphery, but the invention is not limited to any particular spacing as the time in which the curd is subjected to the draining step and the mechanical cheddaring step augment the removal of remotely located slugs or pockets of free whey. The draining step can usually be completed in a period of about twenty minutes but should be continued until it is evident that the curd mass is relatively free of whey. The perforated drain tubes are then withdrawn from the curd.

About twenty minutes after the perforated drain tubes have been withdrawn and when the curds have started to fuse and the dry acid has started to increase the mechanical or power cheddaring step is initiated. This is accomplished by segregating a layer of curd from the remainder of the mass as, for example, by passing a horizontal blade through the mass until its forward end is about two-thirds the distance from the rear to front wall so as to leave an opening one-third the distance between the front wall and forward edge of the blade. Pressure is applied to the segregated layer by means of a plunger which forces the curd from its position below the blade through the opening and into the remainder of the curd mass. As stated above, this produces a displacement of successive layers of the curd mass toward the bottom and front walls of the confined space to separate any additional pockets of whey from the curd which can then drain from these areas. Successive segregating and displacing steps are performed by withdrawing the blade and plunger to permit the curd to fall into the open space and then operating the blade and plunger successively. This mechanical working of the curd mass, in addition to expelling additional whey, further augments fusion and matting of the curd into a uniform cohesive texture characteristic of a good cheese. The cheddaring operation is repeated until the entire mass has been mechanically worked or cheddared. This may require the cheddaring steps to be repeated six or eight times or until the operator is satisfied with the texture of the curd. The mechanical cheddaring should be continued until a "chicken breast texture" is acquired when strings of the curd will adhere to each other as well understood in the art by experienced cheese makers. The cheddaring operation requires a relatively short period of time of for example, twenty minutes.

Upon completion of the mechanical or power cheddaring of the curd mass within the confined space, the mass is allowed to stand quiescent for from thirty to sixty minutes while the dry acid develops by biochemical action. Dry acid development is required if a cheese having a flavor and aroma of the desired quality is to be produced.

After the above described treatment of the curd mass has been completed it is removed from the confined space and salted usually after milling and hooped for storage. These latter steps may be conventional and form no part of the improvement of the present invention.

A preferred apparatus for carrying out the method of the present invention is generally similar to that illustrated and described in the prior McCadam application, referred to above. As shown in FIGURES 1 to 4 the apparatus comprises a supporting frame 2 mounting a rectangular vessel 3 constituting the confined space in which the curd is drained and cheddared. The vessel 3 projects upwardly from the top of the frame 2 and has a bottom wall 4, a front wall 5, a rear wall 6, opposed side walls 7 and 8, see FIGURE 2, and an open top 9. The bottom wall 4 comprises a fixed plate having a series of perforations 10 over its entire area. Under the bottom wall 4 there is a vertically movable plate 11 having upstanding plugs 12 which, when the plate is in its normally elevated position, fit within the perforations 10 and form a substantially unbroken flat surface with the top of the bottom wall 4. The movable plate 11 is guided by depending pins 13 for vertical movement and is raised and lowered by a hydraulic motor 14. Below the bottom assembly 4 and 11 of the vessel 3 is a suitable drain board 15 for collecting whey leaving the vessel 3 through the perforations 10.

A horizontally arranged parting knife or blade 18 is mounted in guides 19 and 20 in the sides 7 and 8 of the vessel 3 for sliding movement therein. The horizontal blade extends through an opening in the rear wall 6 of the vessel 3 and is connected at its rearward end to a hydraulic ram 21 mounted on the frame 2. The hydraulic ram 21 is of the double acting type to move the blade 18 forwardly or rearwardly in spaced relation to the bottom wall 4 of the vessel.

The front wall 5 of the vessel 3 has an opening 22, see FIGURES 1 and 9, above the bottom wall 4 and extending throughout the entire width of the vessel 3 as shown in FIGURE 9. The opening 22 may be closed by a blade 23 mounted in guides 24 and 25 on the side walls 7 and 8 for vertical movement upwardly to close the opening 22 or downwardly to uncover the opening. Blade 23 is mounted at the ends of piston rods 26 and 26' of hydraulic rams 27 and 27' for actuating the blade to open or close the opening 22. The sides of the blade 23 fit rather loosely in the guides 24 and 25 and with respect to the forward end of the bottom wall 4 to permit whey to drain from the vessel 3. A lip 28 is provided at the lower edge of the vertical blade 23 to guide the whey draining from the vessel 3 to one end thereof.

The opening 32 in the rearward wall 6 of the vessel 3, see FIGURE 10, through which horizontal blade 18 moves extends throughout the width of the vessel 3 and a plunger 33 also moves through the opening from the rearward wall 6 to the forward wall 5. The plunger 33 is connected to a hydraulic ram or rams 34 mounted on the frame 2 for actuating the plunger forwardly through the bottom of the chamber under the horizontal blade 18. Thus, upon operation of the hydraulic ram 34, the plunger may be moved through a portion only of its full stroke corresponding to the width of the vessel 3 or through a full stroke across its entire width. Mounted on the frame 2 at the front of the apparatus is a conveyor 35 which underlies the opening 22 in the front wall 5 of the vessel and projects outwardly therefrom to receive cheese product extruded through the opening by the plunger 33. As thus far described, the apparatus is generally the same as that illustrated and described in the McCadam application, referred to above.

In accordance with the present invention, means are provided for draining whey from the curd mass in the vessel 3 at spaced locations over its entire area, removing the draining means and mechanically cheddaring the curd mass without personal contact with or labor on the curd mass. These means drain additional whey from the curd mass to eliminate any pockets of whey and produce a matting of the curds to thereby provide a uniform dry mass suitable for dry acid development.

To this end, a separating device 36 is provided having a rotating screen for draining free whey from the curd and having an outlet opening 37 above and at one side of the vessel 3. Underlying the outlet opening 37 of the separating device 36 is an inclined chute 38 so positioned and inclined as to deliver separated curd to the center of the vessel 3. As shown in FIGURES 2 and 3 the chute 38 has a pivoted section 38' which folds upwardly toward the outlet 37 of the separating device 36 to a compact position.

The draining means in the vessel 3 comprises a plurality of spaced perforated tubes 40 arranged in spaced relation to each other throughout the curd mass, see FIGURES 2 to 4. The perforated tubes 40 act as sieves and are mounted on an open rectangular frame 41 having upwardly inclined trusses 42 at each end and connected at their apex by a cross bar 43 extending between the trusses. The extended ends of the cross bar 43 are connected to the ends of piston rods 44 and 44', see FIGURE 1, of hydraulic rams 45 and 45', respectively, for raising and lowering the frame 41. Thus, frame 41 may be raised and lowered to position the perforated tubes 40 in vertical position in the vessel 3 with their lower ends resting on the horizontal blade 18 and extending throughout the height of the curd mass delivered to the vessel.

As shown most clearly in FIGURES 2 to 4, the frame 41 comprises parallel beams 46 and 47 connected at their ends by transverse members 48 to form an open rectangular structure with truss members 42 projecting upwardly from the ends of the beams. Rings 49 are attached to mounting plates 50 as by welding and the mounting plates, in turn, are attached to the beams 46 and 47 at spaced points therealong. The perforated drain tubes 40 are slidable into and out of the rings 49 to mount them to depend vertically from the frame. As stated above, the rings 49 should be so spaced along the beams 46 and 47 as to position the peripheries of the perforated tubes 40 about twelve inches from each other. The transverse spacing members 48 also are of a dimension to position corresponding pairs of tubes approximately twelve inches from each other.

One of the perforated tubes 40 is shown in detail in FIGURE 5 as having an upper sleeve portion 54 which slidably fits in the ring 14 and with an annular flange 55 at its upper end adapted to rest on the top of a ring. The depending portion of the tube 40 below sleeve 54 has perforations 53 throughout its length except that its lower extremity has an internally threaded collar 56. As shown in FIGURE 6, the perforations 53 in the periphery of the tube 40 are arranged in rows and, in a preferred construction, the perforations are 3/32 of an inch in diameter and the periphery of the perforations are spaced 3/32 of an inch from each other. The lower end of each tube 40 is closed by a plug 57 having screw threads cooperating with the internally threaded collar 56 and an upwardly projecting nipple 58 of smaller diameter provided with interconnected transverse and vertical bores 59 and 60. Preferably, all of the parts of the perforated tube 40 as well as the frame 41 are composed of stainless steel and all of the parts are removable for cleaning and sterilization.

A rubber hose 64 for each perforated tube 40 extends into and throughout the length thereof and the lower end of the hose is pressed over the nipple 58 of the plug 57 to connect it thereto. An annular plug 65 surrounds the rubber hose and is pressed into the upper sleeve 54 of the perforated drain tube to seal the joint therebetween and provide an annular space 66 between the tube and hose. The opposite end of the hose 64 extends upwardly beyond the closure plug 65 and is connected to one of a plurality of nipples 67 on a header 68 connected to a vacuum pump 69, see FIGURE 2, to produce a partial vacuum at the interior of each rubber tube. Thus, the rubber hose 64 extends axially of the lumen of the perforated drain tube to provide the annular space 66 around the rubber hose into which whey may flow from the curd mass and then downwardly by gravity toward the plug 57. The partial vacuum at the interior of the rubber hoses 64 draws whey through the transverse bore 59 in the nipple 58, see FIGURE 5, and upwardly through the vertical bore 60 to remove whey from the curd mass as quickly as it flows into the drain tube.

As shown in detail in FIGURES 2, 7 and 8, the header 68 is in the form of a tube closed at one end by a removable plug 70 and connected at its other end through a coupling 71 to a line from the vacuum pump 69. The header 68 also is provided with a hook 72 for detachably connecting it to the cross bar 43 of the frame 41. It will be observed from the above description that the header 68 can be detachably connected from the frame 41 and coupling 71, the hoses 64 may be detached from the perforated tubes 40 by withdrawing plugs 64, the perforated tubes 40 withdrawn from the rings 49 and the plugs 57 detach from the perforated tube so that all of the parts may be cleaned and sterilized before being used to process a batch of cheese and may be easily and quickly assembled on the frame 41.

Referring back to FIGURE 1 the apparatus has improved structure for mechanically cheddaring the curd. These improvements comprise an indicator 75 having one end 76 connected to the piston rod of the hydraulic ram 21 for operating the horizontal blade 18 and a pointer 77 at the opposite end which cooperates with an index 78 on the side of the vessel 3 to indicate the position of the end of the horizontal blade to an operator. Thus, when the curd is to be mechanically cheddared, the operator controls the hydraulic ram 21 to move the horizontal blade across the vessel to position its forward edge, for example, about two-thirds of the distance to leave an opening 79 between it and the front wall 5 of about one-third the distance, as shown in FIGURES 10 and 11. The curd can then be mechanically cheddared by operating the plunger 33 to displace the layer of curd segregated below the blade through the opening 79 into the remainder of the mass of curd. To prevent the plunger 33 from ever moving beyond the end of the blade, a suitable interlock between the plunger and blade is provided. This interlock may have any suitable form, such as limit switches in an electric circuit for controlling the rams 21 and 34, but in the illustrated embodiment a mechanical interlock is illustrated comprising a detent 80, see FIGURES 10 to 13, depending from the end portion of the horizontal blade 18 which is engaged by the plunger 33 during its forward movement.

In addition, the cheddaring mechanism comprises a guide block 81 positioned at the rear of the forward wall 5 and opposite the plunger 33 to guide the curd upwardly through the opening 79. The guide block 81 extends throughout the width of the vessel 3 and has a curved surface 82 opposite the plunger. In the illustrated embodiment the guide block 81 is of a size to pass through the opening 22 in the front wall 5 of the vessel 3, see FIGURES 9 to 13. Thus, after the curd mass has been thoroughly drained by the perforated tubes 40 and the latter have been withdrawn, the vertical blade 23 is lowered to uncover the opening 22 and the guide block 81 is inserted. Vertical blade 23 is then raised to close the opening and horizontal blade 18 withdrawn to permit the curd mass to flow downwardly toward the bottom wall of vessel 3. After the completion of a cheddaring operation and prior to removal of the finished cheese from the vessel 3 the vertical blade 23 may be operated and the guide block 81 removed through the opening 22. A preferred form of the apparatus having now been described in detail the mode of operation of the apparatus is next explained.

For purposes of description let it be assumed that the horizontal blade 18 has been actuated by hydraulic ram 21 to the position shown in FIGURE 1 where it overlies the bottom wall 4 of the vessel 3 in spaced relation thereto. Let it further be assumed that the frame 41 has been lowered by means of the hydraulic rams 45 and 45' to position the perforated tubes 40 in the vessel as shown in FIGURES 1 and 2, and that plate 11 and plugs 12 have been actuated by motor 14 to close perforations in the bottom wall 4.

To initiate a cheese making operation a batch of curd is delivered from the separator 36, see FIGURES 1 and 2, and down the chute 38 to the center of the vessel 3 where it surrounds the perforated tubes 40. After the entire batch of curd and whey has entered vessel 3, the plate 11 is operated by its motor 14 to withdraw plugs 12 from perforations 10 through which whey may drain, see FIGURE 1, and the vacuum pump 69 is initiated, see FIGURE 2, and operated through the header 68 and rubber hoses 64 to produce a partial vacuum in the annular spaces 66 between the perforated tubes 40 and hoses 64, see FIGURE 5. Free whey flows through the perforations 53 into the space and downwardly by gravity to the bottom of the tubes. The free whey then flows through the transverse and vertical bores 59 and 60 in the nipples 58 of the closure plugs 57 and up through the center of the rubber hoses 64 and through the manifold 68 to the vacuum pump 69. Furthermore, the partial vacuum in the perforated drain tubes 40 causes any pockets of free whey in the relatively soft jelly-like curd to migrate toward the tubes, see FIGURE 4, and the tubes are so spaced over the entire area of the curd mass as to collect substantially all of the free whey. However, the perforations 53 in the tube 40 are of such size as to prevent the flow of curd into the tubes. After the curd mass has been subjected to the draining operation for a period of time to remove substantially all of the free whey, the frame 41 is raised from the position illustrated in FIGURE 2 to that illustrated in FIGURE 3.

The curd is then ready for mechanical cheddaring and for this purpose the vertical blade 23 is lowered, the guide block 81 inserted through the opening 22 in the front wall 5 of the vessel and the vertical blade again operated to close the opening and provide a backing for the guide block. The horizontal blade 18 is withdrawn as shown in FIGURE 10 to permit the mass of curd to flow downwardly in the vessel 3 against the bottom wall 4. Also the movable plate 11 is actuated by its motor 14 to open the perforations 10 in the bottom wall 4 so that whey may flow from the curd mass. Furthermore, the relatively loose joint between the guides 24 and 25 and vertical blade 23 permits drainage from the front wall of the vessel.

The curd is mechanically cheddared by first moving the horizontal blade 18 from the position shown in FIGURE 10 to that shown in FIGURE 11. The plunger 33 is then operated forwardly from the position illustrated in FIGURE 11 to that illustrated in FIGURE 12 to apply internal pressure to the segregated layer of curd underlying blade 18 to cause it to flow forwardly and upwardly through the opening 79 into the remainder of the mass of curd. It will be noted that the depending detent 80 at the forward end of blade 18 is engaged by the plunger 33 at the end of its stroke to limit its forward movement. The cheddaring operation is continually repeated by withdrawing the blade 18 and plunger 33 to the position illustrated in FIGURE 10 and then successively moving the blade and plunger as illustrated in FIGURES 11 and 12. Thus, the blade 18 segregates layers of the curd which are then physically displaced by the application of pressure and these operations are repeated until all portions of the curd mass have been cheddared. This cheddaring operation squeezes any remaining whey which may be present in the curd mass toward the bottom wall or front wall where it is drained and the pressure and intimate contact of the curds produces a matting of the curds into an adhesive mass to provide a good texture of curd with a low moisture content.

After the cheddaring operation has been completed the curd mass is allowed to stand in a quiescent state for a period of time while the acid content of the dry curd mass increases to produce a product of good to excellent texture and taste. Following the acid development, the horizontal blade 18 may be actuated across the entire area of the vessel 3 as illustrated in FIGURE 13, the vertical knife 23 lowered and the plunger 33 actuated to deliver the cheese from the vessel 3 to the conveyor 35 as shown in FIGURE 1. During such delivery of a block of cheese extruded from the vessel 3 by plunger 33, the vertical blade 23 may be actuated to cut the block as it is delivered through opening 22 into slabs for further processing such as milling, salting and hooping in accordance with conventional practice in making cheese.

It will now be observed that the present invention provides an improved method of and apparatus for producing Cheddar type cheese which reduces the free whey and moisture content of the curd mass during dry acid development therein. It will further be observed that the present invention provides a new method of and apparatus for mechanically cheddaring the curd mass. It will still further be observed that the present invention provides an improved apparatus for removing free whey and mechanically cheddaring the curd mass which is of relatively simple and compact construction, economical to manufacture, easily disassembled for cleaning and sterilization and one which is reliable in operation for producing excellent cheese in flavor and texture.

While a single embodiment of the invention is herein illustrated and described it will be understood that changes may be made in the steps of the method and in the form and construction of the apparatus without departing from the spirit or scope of the invention. For example, it will be understood that the batch of curds and whey may be introduced into the vessel 3 with the horizontal blade withdrawn and the vertical blade actuated to close opening 22 in the front wall for draining the curd through the perforated tubes and bottom wall simultaneously. This arrangement increases the capacity of the vessel 3 and the amount of curd that may be processed in a single batch. Therefore, without limitation in this respect, the invention is defined by the following claims.

I claim:

1. In a method of making Cheddar cheese comprising the steps of inoculating pasteurized milk with a culture of a lactic acid-producing starter, ripening the inoculated milk with rennet to coagulate the milk, cutting the coagulated curd and heating the curd and whey, that improvement which comprises separating free whey from the curd, delivering the separated curd to a confined space, draining whey from the interior of the curd mass at a plurality of spaced locations throughout the area of the curd mass in said confined space to form a block of the curd, partially dividing the block of curd in the confined space, subjecting the curd at one partially divided area of the block to internal pressure sufficient to cause a displacement of a portion of the curd mass into the remainder of the mass, said simultaneous application of pressure to and movement of the curd mass accelerating the removal of whey while maintaining pressure on the curd to mat the curd and move any pockets of free whey to a location where it can drain, and thereafter permitting the block of matted curd to set for a period of time to develop the acid content thereof.

2. In a method of making cheese, the improvement which comprises, delivering a batch of curds and whey to a confined space, draining whey from at least one side of the confined space and at spaced locations at the interior of the mass to form a block, simultaneously applying pressure to and moving the curd mass in the confined space to accelerate the removal of whey while maintaining pressure on the curd mass to cause the curd to mat and move any pockets of free whey toward the side of the confined space where it drains therefrom, continuing the application of internal pressure and displacement of the curd mass until the curd is well matted and all free pockets of whey have been removed from the block, subjecting the block in a quiescent state to a temperature favorable to dry acid development for a period of time to produce a cheese having the desired flavor and aroma, and then removing the cheese from the confined space.

3. The method of mechanically cheddaring a curd mass which comprises delivering a mass of curds and whey to a confined space, draining free whey from the mass to form a block of the remaining curd, partially segregating a layer of the curd from the remainder of the block to provide a passage between the segregated layer and remainder of the block at one side of the confined space, forcing the segregated layer of curd into the remaining mass of curd through the passage therebetween to mat the curd and move pockets of whey therein to a location where it will drain, draining whey separated from the curd mass during the pockets of such treatment, and repeating the steps of segregating layers of curds and forcing the separated layers into the remainder of the mass until the entire mass has been so treated and the curds have matted throughout the block.

4. In a method of making cheese, the improvement which comprises, delivering a mass of curds and whey to a confined space, draining whey from the curd mass from at least one side of the confined space, inserting perforated drain tubes into the curd mass at spaced locations throughout its entire area to extend throughout the height of the mass, subjecting the interior of the perforated tubes to a partial vacuum to withdraw whey therefrom, withdrawing the drain tubes after all of the free whey has been drained, mechanically displacing a portion of the mass of curds into the remainder of the mass to move all pockets of free whey from the interior of the curd mass to the side of the confined space from which it can drain, and thereafter subjecting said mass of curd to conditions favorable to dry acid development.

5. A cheese making apparatus comprising a vessel having bottom and side walls and an open top and forming a chamber therein, a plurality of perforated drain tubes, means for mounting said tubes for movement into said vessel through the open top to position the tubes in spaced relation in the vessel, means for delivering a mass of curds and whey into the vessel and around said drain tubes, means for producing a partial vacuum in said perforated tubes to withdraw whey from the curd mass, and a mechanical cheddaring mechanism in the vessel comprising a blade mounted to move parallel to one wall of the vessel, a plunger between the blade and wall and means for operating said blade and plunger alternately to segregate a portion of the curd from the remainder of the curd mass and provide an opening therebetween, force the segregated portion of curd into the remainder of the mass through the opening therebetween and then withdraw both the blade and plunger to permit the curd mass to flow into the space for repeated mechanical cheddaring by the blade and plunger.

6. A cheese making apparatus in accordance with claim 5 in which the means for mounting the perforated tubes is a frame on which the perforated tubes are mounted to depend vertically into the vessel, operating means for lowering the frame to position the tubes so as to remove whey from the curds and withdrawing the perforated drain tubes from the curd mass prior to mechanical cheddaring.

7. A cheese making apparatus comprising a vessel having an open top, a frame mounted for movement vertically toward and away from the open top of the vessel, a plurality of perforated tubes mounted on and depending from said frame to project into said vessel, means for delivering a mass of curd and whey into said vessel to surround said perforated tubes, means for producing a partial vacuum in said perforated tubes to withdraw whey from the curd mass, and means in the vessel for mechanically cheddaring the curd mass after the whey has been withdrawn therefrom.

8. A cheese making apparatus in accordance with claim 7 in which the means for mounting the frame for movement vertically comprises truss members extending upwardly from the frame, a cross bar extending across the open top of the vessel to which the truss members are connected, hydraulic cylinders mounted on the sides of the vessel, and piston rods projecting from the cylinders and connected to the cross bar for raising and lowering the frame.

9. A cheese making apparatus in accordance with claim 7 in which the frame is an open structure having parallel beams, rings at spaced locations along said beams and having an inside diameter to provide a sliding fit with the exterior of the perforated tubes to adapt the latter to detachably mount them on the frame, a header overlying the open frame and having nipples projecting therefrom, rubber tubes extending downwardly to the bottom of the perforated tubes with the end of each rubber tube detachably connected to a nipple on the header, and a vacuum pump connected to the header.

10. A cheese making apparatus in accordance with claim 9 in which the header is detachably connected to the frame, the tubes detachably connected to the nipples on the header and removable from the perforated tubes and the perforated tubes detachably mounted on the open frame for cleaning and sterilizing.

11. A cheese making apparatus in accordance with claim 9 in which the lower end of each perforated tube is closed by a plug having a nipple on which the lower end of the rubber tube is attached to provide an annular space between the tube and hose, and transverse and longitudinal openings in the nipple to provide communication between said annular space and interior of the rubber hose.

12. A cheese making apparatus comprising a vessel having bottom and side walls and an open top and forming a chamber, means in said vessel for draining whey from the curd therein, a blade mounted to move parallel to one wall of the vessel, a plunger between the blade and wall, and means for operating said blade and plunger to segregate a portion of the curd from the remainder of the curd mass and provide an opening therebetween, force the segregated portion of curd into the remainder of the mass through the opening and then withdraw both the blade and plunger to permit the curd mass to flow into the space prior to repeating the operations of the blade and plunger.

13. Cheese making apparatus in accordance with claim 12 in which a guide block is provided in said vessel at the side opposite the plunger, and said guide block extending throughout the width of the vessel and having a curved surface engaged by the curd displaced by the plunger to direct it into the remaining curd mass.

14. A cheese making apparatus in accordance with claim 12 in which the blade is arranged horizontally and mounted to move parallel to the bottom wall of the vessel, an opening in the wall of the chamber opposite the plunger below the horizontal blade, a vertical blade mounted for movement to overlie the opening, and said guide block being removably mounted in the vessel through the opening in the side wall.

15. A cheese making apparatus in accordance with claim 12 having means at one wall providing an area for draining whey from the curd, and said plunger displacing portions of the curd mass during mechanical cheddaring to deliver any pockets of whey in said curd to said draining area.

16. A cheese making apparatus in accordance with claim 12 in which the blade and plunger have interlocking means which interengage when the plunger is moved to the end of the blade.

17. A cheese making apparatus in accordance with claim 12 in which a separator is mounted at one side and above the open top of the vessel, a chute overlying the outlet from the separator, and said chute being located to deliver separated curd from the separator to the center of the vessel.

18. A cheese making apparatus in accordance with claim 12 in which an indicator is provided at the exterior of the vessel and connected to the blade for movement therewith to indicate the location of the end of the blade at the exterior of the vessel.

References Cited in the file of this patent

UNITED STATES PATENTS

| | | |
|---|---|---|
| 2,494,638 | Stine | Jan. 17, 1950 |
| 2,768,083 | Hensgen | Oct. 23, 1956 |
| 3,078,169 | McCadam | Feb. 19, 1963 |
| 3,078,170 | Leber | Feb. 19, 1963 |